(12) United States Patent
Hainzinger et al.

(10) Patent No.: US 7,886,565 B2
(45) Date of Patent: Feb. 15, 2011

(54) BENDING APPARATUS FOR LONG WORKPIECES, ESPECIALLY TUBES, AND A DEVICE FOR MEASURING LENGTH OF A BENDING

(75) Inventors: Johann Hainzinger, Pfaffenhofen (DE); Johann Niedermeier, Talstrasse 30, 85293 Langwaid (DE)

(73) Assignee: Johann Niedermeier, Langwaid (DE)

( * ) Notice: Subject to any disclaimer, the term of this patent is extended or adjusted under 35 U.S.C. 154(b) by 571 days.

(21) Appl. No.: 11/795,004

(22) PCT Filed: Jan. 7, 2006

(86) PCT No.: PCT/EP2006/000080

§ 371 (c)(1),
(2), (4) Date: Nov. 29, 2007

(87) PCT Pub. No.: WO2006/074880

PCT Pub. Date: Jul. 20, 2006

(65) Prior Publication Data

US 2008/0087065 A1    Apr. 17, 2008

(30) Foreign Application Priority Data

Jan. 11, 2005  (DE) .................. 20 2005 000 353 U
May 23, 2005  (DE) .................. 20 2005 008 068 U
Jun. 28, 2005  (DE) .................. 20 2005 010 145 U
Jul. 8, 2005   (DE) ...................... 10 2005 032 057

(51) Int. Cl.
*B21D 7/02*    (2006.01)
*B21J 13/08*   (2006.01)

(52) U.S. Cl. .................. 72/31.05; 72/31.04; 72/37; 72/149; 72/377; 72/458; 72/459

(58) Field of Classification Search ................ 72/31.05, 72/37, 149, 377, 457, 458, 459
See application file for complete search history.

(56) References Cited

U.S. PATENT DOCUMENTS

| 3,464,247 | A | * | 9/1969 | Beckwell ........................ 72/37 |
| 4,425,784 | A | * | 1/1984 | D'Gerolamo ................. 72/459 |
| 5,058,407 | A | * | 10/1991 | Parker .......................... 72/459 |
| 5,144,823 | A | * | 9/1992 | Wood ......................... 72/31.05 |
| 5,669,258 | A | * | 9/1997 | Luebke ........................ 72/458 |
| 6,209,371 | B1 | * | 4/2001 | Guinn ............................ 72/37 |

(Continued)

*Primary Examiner*—David B Jones
(74) *Attorney, Agent, or Firm*—McNair Law Firm, PA; Cort Flint (57) ABSTRACT

A bending apparatus for long workpieces, especially tubes, to form a curved section extending between two bend end points (A, B) on the tube wherein the curved section is located about a center bend point X, distanced from a reference position (P) by a predetermined distance (L) extending along a tube, wherein the bending apparatus includes a bending segment rotatable about a pivotal axis so that the tube is positioned on a semicircular scale with a starting zero point of 0° to mark the start of the curved section at one of the bend end points (A, B), which point is designated as a bending-start point, characterized, in that the apparatus has a bend length-selector having at least one measurement edge the measurement edge aligning with the center bend point (X) to automatically place the tube at the bending-start point and at the 0° mark of the bending segment upon the placement of the tube in the bending apparatus.

20 Claims, 6 Drawing Sheets

U.S. PATENT DOCUMENTS

| | | | |
|---|---|---|---|
| 6,422,054 B1 * | 7/2002 | White | 72/458 |
| 6,834,527 B2 * | 12/2004 | Hopwood | 72/459 |
| 7,475,580 B1 * | 1/2009 | Page | 72/31.05 |
| 7,624,607 B2 * | 12/2009 | King | 72/458 |

* cited by examiner

BENDING APPARATUS FOR LONG WORKPIECES, ESPECIALLY TUBES, AND A DEVICE FOR MEASURING LENGTH OF A BENDING

BACKGROUND OF THE INVENTION

The invention concerns a bending apparatus for long workpieces, especially tubes, and a device for measuring tube bend length.

In the heating field, it is known that bending apparatuses are applied to the bending of tubes, pipes, and the like (hereinafter, referred to as "tubes"). The tubes are frequently bent at right angles. For this service, a known, generic bending apparatus possesses a bending segment carrying a semicircular, protractor-like scale. The scaled bending segment pivots by means of a drive motor and the bending apparatus includes a fixed bending counterpart to hold the tube against the said bending segment. Such a bending apparatus has been disclosed in DE 195 10 330 C2. The bending apparatus includes a profiled press-fit carrier which seizes the free end of the tube and rotates the tube so that the tube is then curved in conformity with a circular arc of the bending segment.

The tube center bend point is advantageously placed by the operator at a predetermined and desired location on the tube. In doing this, it is known, that the operator marks off a longitudinal distance from a selected reference point on the tube. The marked distance is to coincide with tube bend lengths to be defined on an unbent tube and should exactly align with a central axis of the tube following bending, governed by the markings of the above procedure.

Subsequently, a point for the start of bending is defined, by again measuring from the reference position on the extending workpiece. This bend start point linearly differs from the bend center point by a length needed for compensation. The bend start-point of the tube is positioned at the angular zero degrees graduation as seen on a protractor scale on a bending segment and the bending procedure then takes place from this position.

In the cited known determination of the above starting bend point for the bending, the determination is carried out in a somewhat complex manner, either by empirical judgment based on trial and error, or by reference to tabulated data, in which information regarding curvature compensation lengths for currently involved tube diameters in accord with corresponding radii of bends is set forth. The so determined compensation length can then be added to (or subtracted from) a predetermined specified straight line length as measured from the established start-point.

The purpose of the present invention is to provide a bending apparatus for tubes which advantageously includes a bend-length selector which automatically marks a start point for a bend at a predetermined longitudinal position on the tubes.

SUMMARY OF THE INVENTION

The above objectives are accomplished according to the present invention by providing a bend-length selector made integrally with the bending apparatus having a measurement edge which an operator aligns with the bend center point marked on the tube placed into the receiving structure of the length-selector. The selector then automatically positions the bending start point of the tube at a determined compensation distance from the bend center point, and at the zero degree index of the bending segment scale. This is automatic and without recourse to empirical experimentation for the fixation of the bending start-point. In other words, a computation by the operator to determine the position of the start of bending, as calculated from the initial bending position of the workpiece is, by means of the invention, not necessary. The operator thus needs only to observe the starting position for the workpiece and to mark the same thereon. Subsequently, the operator places the tube with its marked longitudinal position, on the retaining equipment of the length-selector. The bending apparatus, now having a properly determined starting position, can be immediately placed in operation.

Advantageously, it is also possible that the length-selector can be a separate component, built with a separate standard pattern plate. If this is done, then the pattern plate can be changed easily to match the bending radius and/or the tube diameter, and like properbars, of different applications. It is also possible that a discrete length-selector, made of stainless steel, can be provided as an add on component to an already operable bending apparatus.

In order to assure a particularly favorable operational procedure, it is possible that the length-selector can be a pivoted device, rotationally mounted on a fixed bending counterpart. The bending counterpart has the function of holding the workpiece, while being subjected to bending pressure, against the bending segment.

A proper positional placement of the bend end point marked on the workpiece by means of the length-selector is assured when the measurement edge at the free end of the length-selector is marked on the workpiece.

Preferably, the pivoted, lever type length-selector possesses a bending counterpart for use in rotational motion, which bending counterpart, in the operational position of the length-selector has the advantage of being in edge circumferential surface contacting with the workpiece, i.e., with the tube. The lever may be pivoted by a hand grip tab moved by the thumb of the operator against the tube.

Advantageously, the length-selector is a metal plate fabricated by deep-draw to produce a "U" shaped cross-section increasing the shape-stability of the length-selector. The "U" profile includes a first arm proximal to the workpiece, providing a measurement edge, and an opposite second arm providing the hand tab.

In accord with a preferred embodiment, the length-selector can be built with two measurement edges. In this case, the first measurement edge of the length-selector is spaced from the marked center bend point a first compensation distance to locate the bend start point. The marked tube point is to be set at the first measurement edge of the length-selector. In this case, the operator's selected reference position of the tube is located on the bending segment, rotary direction behind the zero degree point of the bending segment.

Conversely, if the marked position of longitudinal distance is to be placed on the second measurement edge of the length-selector, the relative point in the direction of rotation of the bending segment is in front of the zero graduation of the bending segment. In this case, the second measurement edge of the bending segment is placed on the tube at a distance from the start point of the bending equal to a second compensation distance.

Now, having the two measurement edges of the length-selector, the operator is enabled to make use of the tube bending machine on both sides, and actually be independent thereof, as to whether or not the reference point established by the operator lies in front of, or behind the zero point of the bending segment.

So that the length of tube dimension to be set on the length-selector by the operator can be done in a simpler manner, it is possible to design the measurement edge as a cross-bar bent away from the arm of the U-profile, proximal to the tube. This cross-bar on which the measurement edge is formed can encompass the tube when the length-selector is in an operational position. In a case, wherein a first, as well as a second measurement edge is placed on the length-selector, it is possible that, in an analogous manner, a first and a second cross-bar can be made a part of the length-selector.

For the purpose of increasing the shape-stability of the above mentioned cross-bars, these, advantageously, can be bound together at their free ends by means of a connector piece running between them.

As a space saving measure, it can be of advantage, if the second cross-bar, which is proximal to the bending-segment, is provided with a projection, extending longitudinally parallel to the tube, and the second measurement edge is located on the end face of the projection.

In accord with a second embodiment example, the length-selector can be designed as an electronic component, which computes the at least first (or only) measurement edge of the operator-sided marked length position and by means of a light source, i.e., this being, for instance, a laser, further designates the said measurement edge on the workpiece, i.e., on the tube. When this is done in this manner, then there will be dimensional agreement, as in the case of the above mentioned length-selector patterned device, between the separating distance of the already established measurement edge of the length-selector and the bending-start point of the aforesaid compensation length.

DESCRIPTION OF THE DRAWINGS

The construction designed to carry out the invention will hereinafter be described, together with other features thereof.

DESCRIPTION OF A PREFERRED EMBODIMENT

Referring now in more detail to the drawings, the invention will now be described in more detail.

Figure 1:
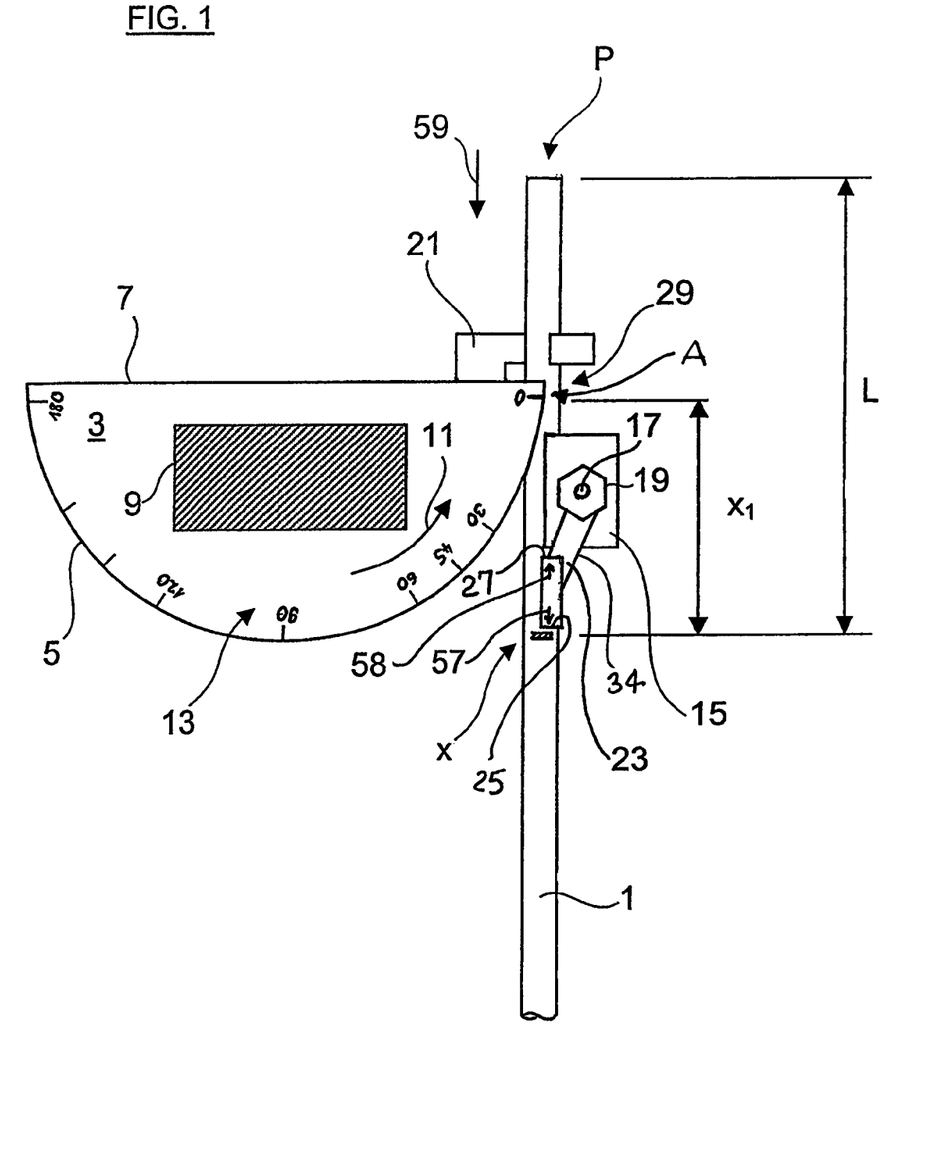
FIG. 1 representing a first embodiment of the invention illustrates a partial top view, in a very schematized manner, of a bending apparatus with a tube, the latter being in an unbent state.

In a partial plan view, FIG. 1 shows a bending apparatus holding an unbent workpiece 1 (i.e., a tube) ready for bending. The bending apparatus includes a bending segment 3, which is a metal plate, shaped and graduated in the manner of a protractor. The plate includes a planar segment base 7 and a semicircle curve 5. Again, in FIG. 1, the bending apparatus is affixed onto a rectangular structural shaft 9, which, by means of a (not shown) drive motor, can be rotated in a bending direction indicated by the arrow 11.

Graduated along the semicircular edge of the curve 5 a bending angle scale 13, which exhibits for the operator a currently predetermined bending angle. The graduation of the scale 13 runs from 0° to 180°. Obviously, in correspondence with the illustrated bending apparatus, tube bends up to 180° can be made.

Further illustrated in FIG. 1, bending segment 3 of the bending apparatus is presented in a starting position, before the beginning of a bending procedure. In this condition, tube 1, which has been inserted into the bending machine is, first, placed in a typical circumferential groove of semicircle curve 5 of bending segment 3. Second, tube 1 lies next to a circumferential groove of a fixed, tube-restraining bending counterpart 15, against which tube 1 is pressed during the bending procedure. The bending counterpart 15 is secured in place by a positioning bolt 17 with an adjusting turning knob 19.

To execute a tube bending, the bending segment 3 has on segment base 7 and a hook like carrier 21. Hook like carrier 21 surrounds a free end of tube 1 so that as bending segment 3 is rotationally activated in turning direction 11, tube 1 is bent along the semi-circumferential grove of curve 5 of bending segment 3.

Figures 2A, 2B:
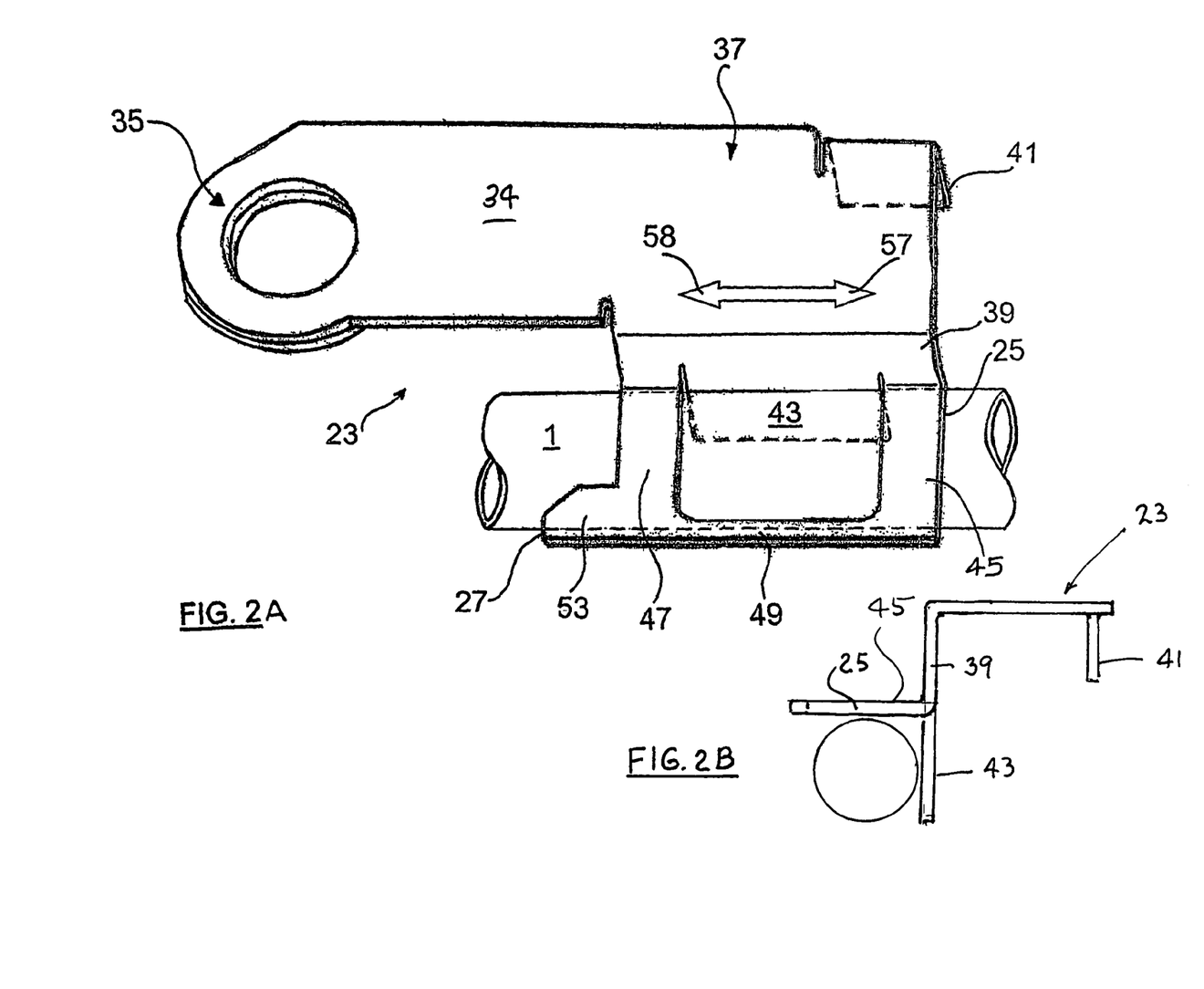
FIG. 2A is a perspective view illustrating a length-selector of the bending apparatus.
FIG. 2B is an end view of the length-selector of FIG. 2A.
Figure 3:
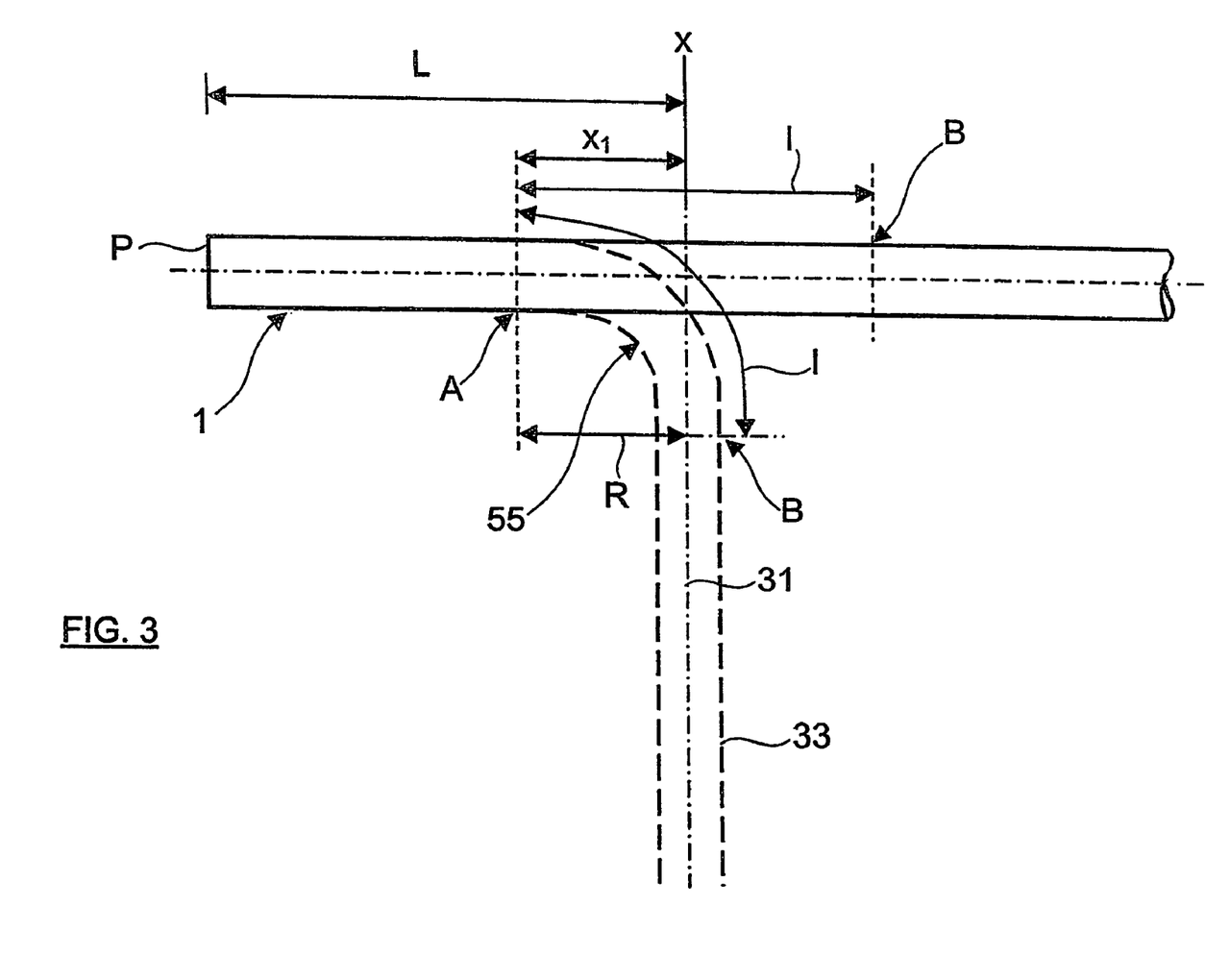
FIG. 3 illustrates a tube, i.e. the workpiece, in its bent and unbent states.

The bending apparatus shown in FIG. 1 also includes, in addition to bending segment 3 and the holding bending counterpart 15, a bend-length selector 23. Length-selector 23 is fabricated with two measurement edges, namely 25, 27, which are best seen in FIG. 2A. Tube 1 can be placed on measurement edges 25, 27, in accordance with a given bend center point determined and marked by the operator. This mark is shown in FIG. 1 as a small, cross-hatched area "X" placed on the tube. The length-selector ensures that a bending starting-point 29 of the tube 1 is automatically placed on the zero degree index of the bending segment 3. As shown in FIG. 3, the marked center bend point "X" of the tube 1 is distanced from the operators chosen reference position P by means of a predetermined length L.

In the FIGS. 1 and 3, reference position P is shown as being identical to an end of the tube 1. Alternatively, reference position P can be relative to an already existing tube bend. In this latter case, specified length L must equal the desired separation distance between reference position P and a central axis 31 of a bent tube 1, depicted as section 33 in FIG. 3.

As can be seen in detail in FIG. 2A, bend-length selector 23 is a sheet metal, shaped piece, which is constructed in the manner of a pivotal lever 34 with an integral hub section 35. FIG. 1 shows bend-length selector 23 only schematically and conceptually, so that the detail of FIGS. 2A, 2B may differ slightly in appearance, but not in substance. By means of hub section 35, which is essentially an opening, length-selector 23 can be rotationally affixed by a position bolt 17, which serves as a pivot axle. As can best be seen in FIG. 2B, length-selector 23 is U-shaped having two arms 39, 41 on free end 37 remote from hub section 35. Arm 39 proximal to tube 1, is provided with a pivotal alignment leg 43, and further has cross-bars 45, 47. Bars 45, 47 are bent away from the U-arm 39 at a right angle. The bars are spaced from each other, in the longitudinal direction of length-selector 23. In an operational position of the length-selector, as shown in FIGS. 1 and 2A, 2B, cross-bars 45, 47 extend over tube 1. The two cross-bars 45, 47 are bound together by a connection piece 49.

Cross-bar 45, by means of its end face remote from the hub section 35 of length-selector 23, forms first measurement edge 25 for aligning with the marked bend position "X" of tube 1.

Cross-bar 47 has a projection 53 on its end proximal to hub section 35. Second measurement edge 27, to be alternately aligned with marked, position "X" of tube 1, is located on the end face of projection 53.

An arm 41 of U-profiled length-selector 23, remote from the tube 1, is constructed as a hand grip tab. The grip enables a simple pivoting activation of length-selector 23 and can be moved by the thumb of an operator.

In use of the bending apparatus shown in FIG. 1, the marked longitudinal bend position "X" of unbent tube 1, can be placed either at first measurement edge 25 or at second measurement edge 27 of length-selector 23.

In the FIGS. 1 and 3, as an example, first measurement edge 25 of the length-selector, remote from reference position P, is used. In this example, reference position P, i.e., the end of tube 1 in turning direction 11, is placed in bending segment 3 behind the zero degree index. The bending in FIG. 1 takes place away from reference position P. The cross-hatched marked point "X" on the tube length falls on center axis 31 of bent tube extension 33. Accordingly, there is a first compensation length X before position "X" of unbent tube 1, as seen in FIGS. 1 and 3. In FIG. 3 a 90° curve 55 made in a straight tube 1. This curvature is to take place between curve points A and B and extends over a curve length l (small "L") with a radius R. Compensation length $X_1$ approximately corresponds to bending radius R of final tube bend 55.

In agreement with the above, in FIG. 1, unbent tube 1 is to be positioned with bend center point "X" at first measurement edge 25 of length-selector 23. The length-selector automatically extends, by distance $X_1$, tube length L away from bending start-point 29. Thereby, bend start point 29 of tube 1 is positioned, without complicated measurement or computational efforts, exactly on the zero degree point of bending segment 3.

Figure 4:
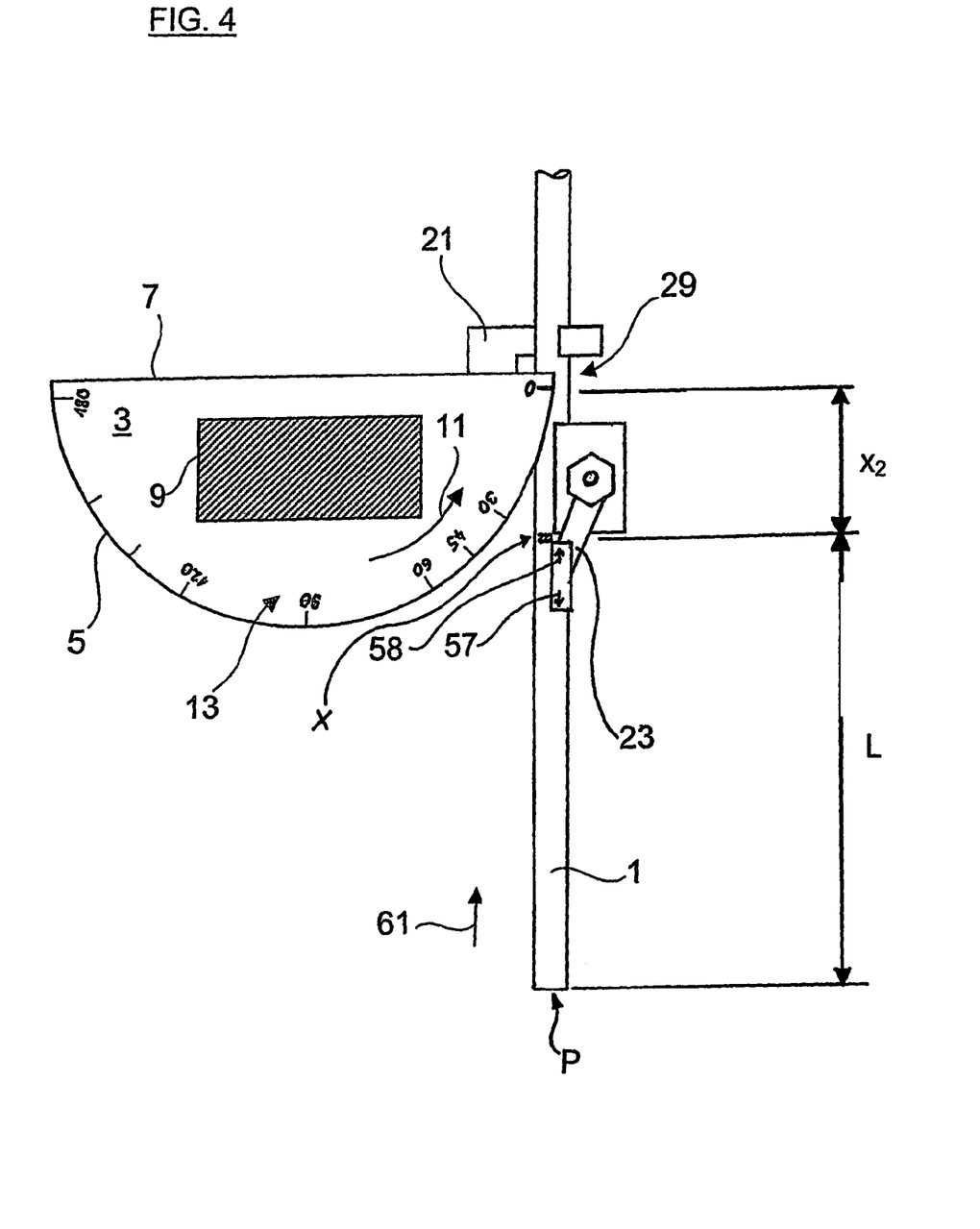
FIG. 4 is an illustration corresponding to FIG. 1.
Figure 5:
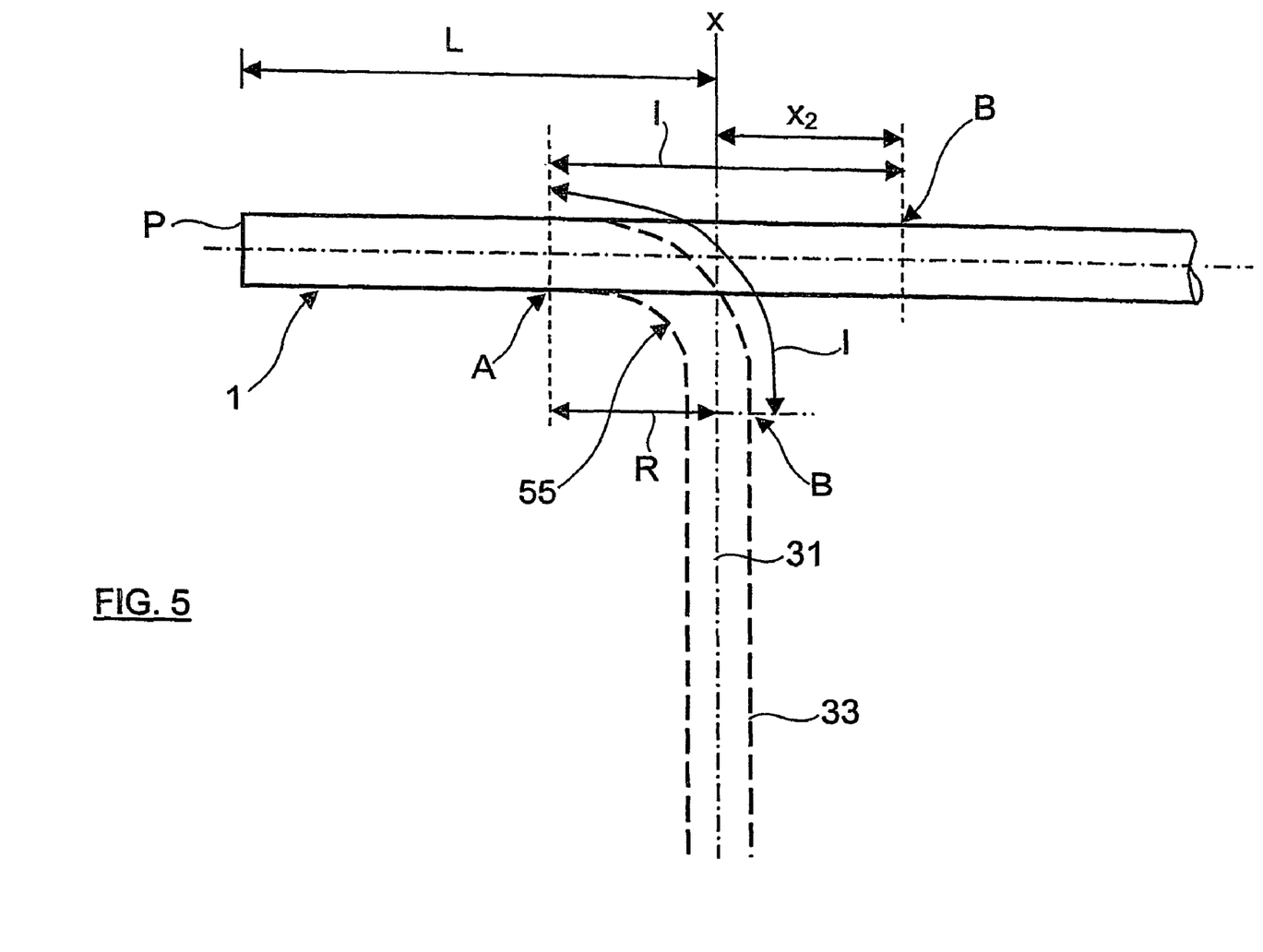
FIG. 5 is an illustration corresponding to FIG. 3.

In FIGS. 4 and 5, a second use occurs, wherein measurement edge 27, proximal to reference position P, comes into use. Referring to FIG. 4, reference position P in bending direction 11 is not behind the zero index of bending segment 3, but is placed before the 0° mark, with the effect that a subsequent bending operation will be in the direction of reference position P and not away from the same.

In this case, so that cross-hatched, center point mark "X" on the length of tube 1, falls on central axis 31 of bent tube extension 33, bending start point 29 is placed approximately at a second compensation distance of $X_2$ after longitudinal position of X, as seen in FIGS. 4 and 5. FIG. 5 in this arrangement, that it is not an end-point A (FIG. 3) but rather a bend point B of the bend, which is to be positioned as bending start-point 29 at the zero index of bending segment 3 in FIG. 4.

In order to have a simple implementation for each of the two cases outlined above with correct measurement edge 25, 27 presented for bending, arrows 57, 58 are provided on the top side of length-selector 23 which are respectively directed to measurement edges 25 and 27. To select the correct measurement edge 25, 27, first the relation of reference position P to the zero index of bending segment 3 is to be defined. In FIG. 1, the positioning of reference position P to the zero index is noted by an arrow 59, whose direction is the same as marking arrow 57. Therefore, designated measurement edge 25, is represented by the arrow 57 of the length-selector 23.

Conversely, in FIG. 4, the direction reference position P to 0° mark of bending segment 3 runs in the direction of an arrow 61, whose direction coincides with the direction of arrow 58. In FIG. 4, the indicated measurement edge 27 of length-selector 23 is designated for use.

Figure 6:
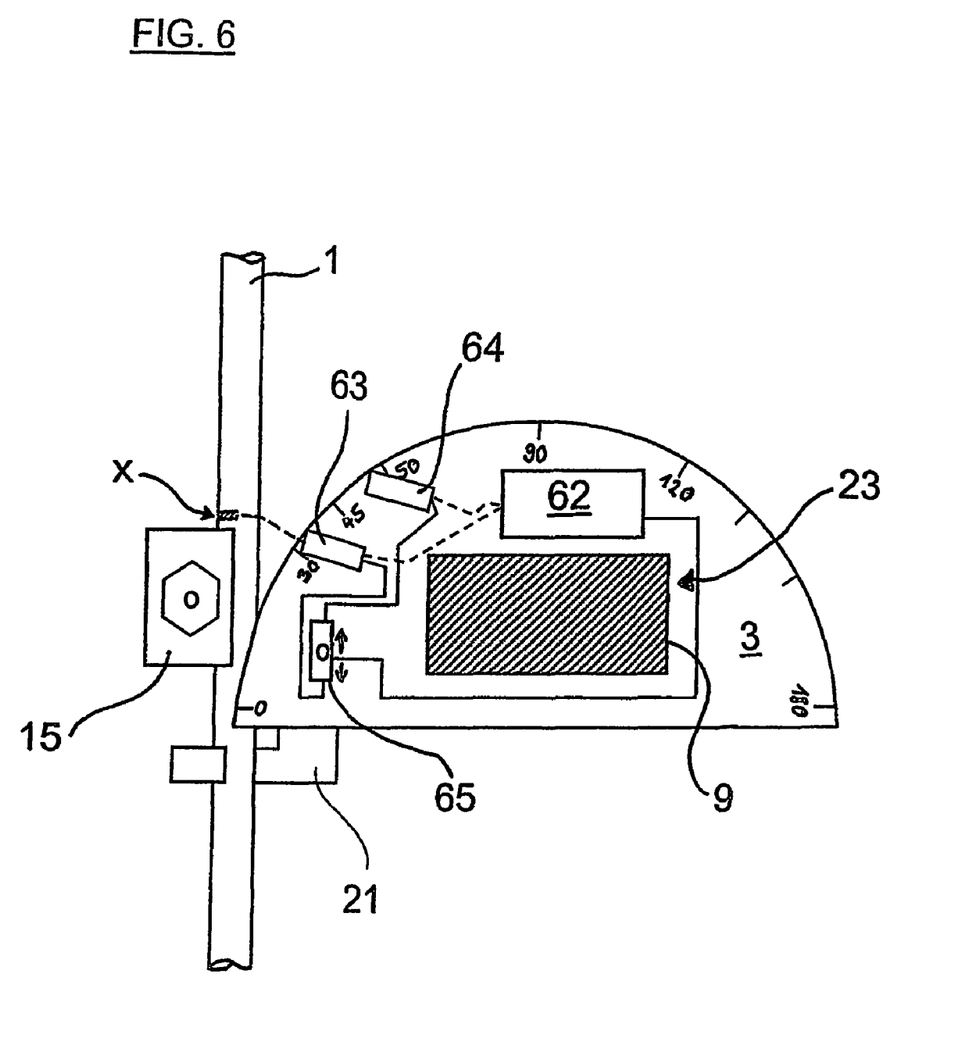
FIG. 6 representing a second embodiment of the invention illustrating a partial top view, in a very schematized manner, of a bending apparatus with a tube, the latter being still in an unbent state.

In FIG. 6, a tube bending apparatus, in accord with a second exemplary embodiment is demonstrated. The tube bending apparatus is identical to the tube bending apparatus as shown in FIGS. 1 and 4, except for the exclusion of mechanical length-selector 23. Differing from the first embodiment described, in this case the function of length-selector 23 is not carried out as a patterned device in accord with the above described type, i.e., being a lever pivoted on a holder bending counterpart 15.

Length-selector 23, as shown in FIG. 6, is designed as an electronic component, placed upon the top-side of bending segment 3. Electronic, length-selector 23 includes a control apparatus 62, in a signaling communication with corresponding light sources 63 and 64. Upon a recognizable signal from control apparatus 62 to light sources 63, 64, a point of light is projected to fall upon the outside circumference of tube 1. This makes available position "X" to be marked by the operator for measurement edges 25, 27.

The control apparatus 62 is also in signal exchange with a selector switch 65. Selector switch 65 selects whether the operators chosen reference position P lies in the rotational direction of bending segment 3 or whether it lies before or after the 0° mark of bending segment 3. Accordingly, by means of this said selector switch 65, the proper measurement edge 25, 27 is chosen, by means of a laser apparatus 63 or laser apparatus 64 and projected onto the circumference of tube 1.

While a preferred embodiment of the invention has been described using specific terms, such description is for illustrative purposes only, and it is to be understood that changes and variations may be made without departing from the spirit or scope of the following claims.

What is claimed is:

1. A bending apparatus for bending tubes to form a tube curved section, said curved section defined by two bend end points of a tube, and a center bend point, said center bend point being defined by a predetermined distance along the tube measured from a reference position, said bending apparatus including a tube bending segment rotatable about a pivot axis having a semicircular scale starting with a zero index which equates with one of said bend end points to define a tube bending-start point on the tube, wherein the apparatus comprises a bend-length selector carried adjacent the tube bending segment between which the tube may be placed, said bend-length-selector having at least one measurement edge which aligns with said center bend point of the tube when placed between said bending segment and said bend-length selector, and said zero index of said bending segment being automatically aligned with said bending-start point of the tube when the tube is held in the bending apparatus at the zero index so that said curve section is accurately formed upon rotation of said bending segment.

2. The apparatus of claim 1, wherein said bend-length selector is a separate component from said bending segment.

3. The apparatus of claim 1 including a tube bending counterpart associated with said bending segment to engage the tube for bending the tube when the tube is placed between said bending segment and said bending counterpart so that said bending counterpart presses the tube against said bending segment when said bending segment is rotated.

4. The apparatus of claim 3 including a lever element pivotally attached to said bending counterpart, wherein at least one measurement edge of said length-selector is located at a free end of said lever element.

5. The apparatus of claim 3 wherein said bend length-selector includes an alignment leg having an operational position in contact with a circumference of the tube.

6. The apparatus of claim 5 wherein said bend-length selector includes a grip, to enable a rotation of said lever element.

7. The apparatus of claim 1 wherein said bend-length selector has a first measurement edge and a second measurement edge one of which can be selected depending on whether the bending operation proceeds in a direction away from the reference position, or proceeds in a direction towards said reference position.

8. The apparatus of claim 7 including a directional marking carried by said bend length selector, said directional marking designating which one of said first measurement edge and said second measurement edge is to be utilized in the bending operation either in a direction toward said reference position or in a direction away from said reference point.

9. The apparatus of claim 1 wherein said bend-length selector includes a pivotal lever element having a U-shaped profile at a free end, including an arm proximal to the tube at which said at least one measurement edge is located.

10. The apparatus of claim 8 including first and second longitudinally spaced cross-bars forming part of said arm of said U-profile, said first and second cross-bars providing said first and second measurement edges, and said arm extending above the tube in the operational position of said bend length-sector.

11. The apparatus of claim 10 wherein first measurement edge, second measurement edge, first cross-bar, and second cross-bar of said length selector are integrally constructed.

12. The apparatus of claim 10 including a connection member connecting said two spaced cross-bars.

13. The apparatus of claim 10 wherein one of said two cross-bars, proximal to the bending segment includes a projection extending in a longitudinal direction of the tube, and having an end face on which said second measurement edge is located.

14. The apparatus of claim 1 wherein said bend-length selector is constructed from a sheet metal piece.

15. The apparatus of claim 1 where for each respective tube having a radius R, a tube to be bent has a length-selector suitable for said radius R.

16. The apparatus of claim 1 wherein said bend-length selector includes an electronic component designed to select at least one measurement edge for the tube and calculate the bend center point dependent on the tube diameter and the bending radius of the tube based on collected data is transmitted by means of a light source such as a laser unit.

17. The apparatus of claim 1 wherein in the case of bending a tube to a right angle, a predetermined, longitudinal distance extending from said reference position of the tube to said bend point center, corresponds to a tube central axis of the bent tubes.

18. The apparatus of claim 1 wherein one of the bend end points, is set at a zero indices of a scale of said bending segment, which indices defines the bending starting point position as well as a compensation distance ($X_1$, $X_2$) from the central bend point (X) of the tube.

19. A bend-length selector for use with a tube bending apparatus for bending tubes to form a desired curved section defined by two bend end points of the tube and a center bend point, said bending apparatus including a tube bending segment rotatable about a pivot axis having a semicircular scale starting with a zero degree index which equates with one of said bend end points to define a tube bend-starting point on the tube, wherein said bend-length selector comprises at least one measurement edge for alignment with a center bend point marked on the tube when the tube is placed between said bending segment and said bend-length selector, and said bend-length selector automatically locating the bend-starting point of the tube at a predetermined distance from the center bend point when the measurement edge is aligned with the center bend point so that said curve section is accurately formed upon rotation of said bending segment.

20. The apparatus of claim 19 wherein said bend-length selector includes a bending counterpart with a circumferential groove which engages the tube when held between the bending segment and the bend-length selector.

* * * * *